May 8, 1962 S. P. HIGGINS, JR 3,034,051
ELECTRICAL APPARATUS
Filed May 21, 1959
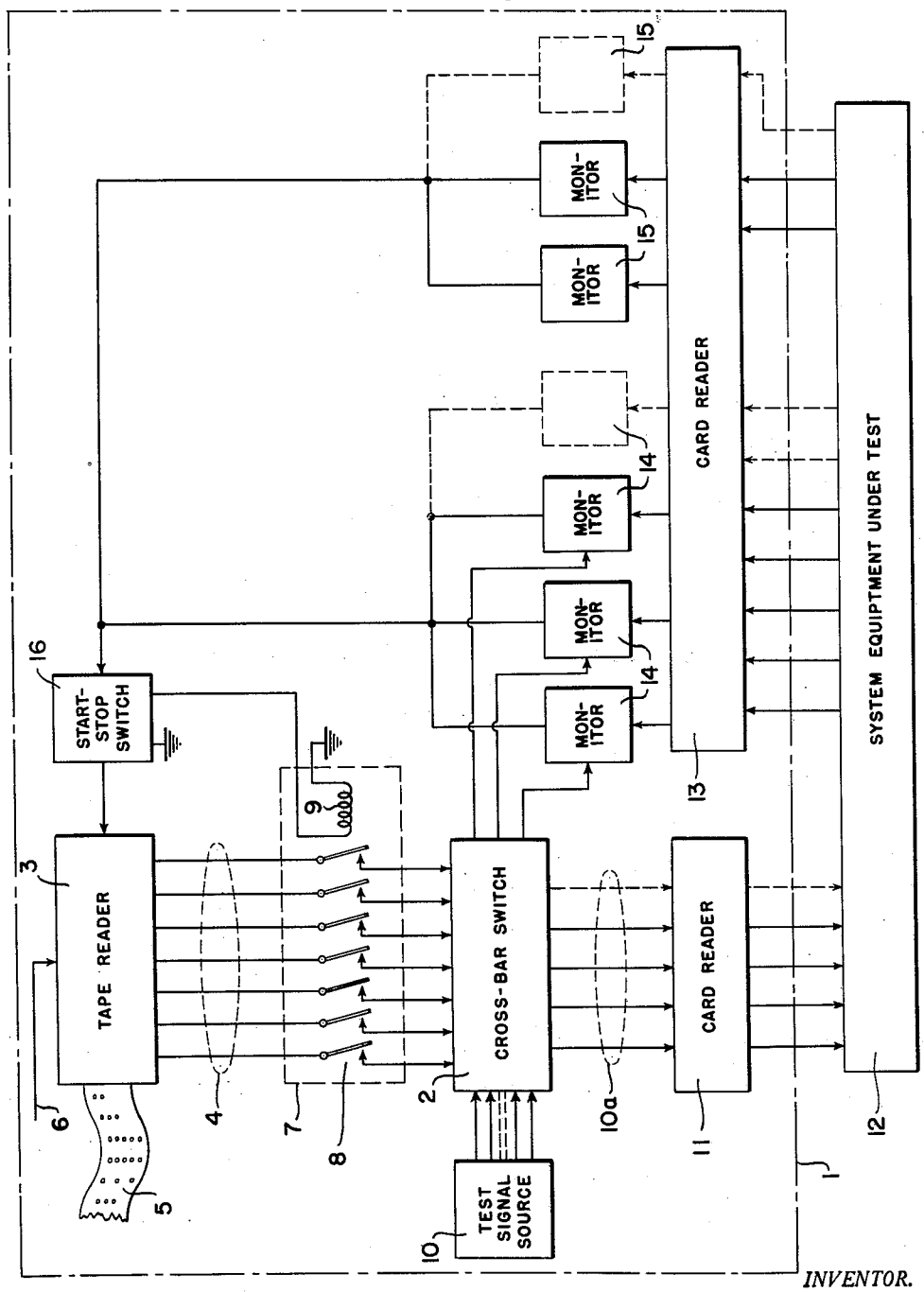
INVENTOR.
STEPHEN P. HIGGINS, JR.
BY
ATTORNEY.

United States Patent Office 3,034,051
Patented May 8, 1962

3,034,051
ELECTRICAL APPARATUS
Stephen P. Higgins, Jr., Fairview Village, Pa., assignor to Minneapolis-Honeywell Regulator Company, Minneapolis, Minn., a corporation of Delaware
Filed May 21, 1959, Ser. No. 814,761
8 Claims. (Cl. 324—73)

The present invention relates to electrical system testing apparatus.

More specifically, the present invention relates a programmed electrical system testing apparatus.

An object of the present invention is to provide a new and improved automatically programmed electrical system testing apparatus.

Another object of the present invention is to provide a new and improved programmed electrical system testing apparatus having a sequential programmer and a fixed programmer.

A further object of the present invention is to provide a new and improved programmed electrical system testing apparatus characterized by the ability to respond to abnormalities in the effects of the testing operation.

A still further object of the present invention is to provide a new and improved programmed electrical system testing apparatus having a simplified operation and construction.

In accomplishing these and other objects, there has been provided, in accordance with the present invention, a programmed electrical system testing apparatus utilizing a sequential programming device in combination with a static programming device. The sequential programming device comprises a crossbar relay switch controlled by a tape reader. Information stored on a tape fed to the tape reader is effective to sequentially energize selected lines of a plurality of test signal lines by means of the crossbar relay switch. The test signal lines are, in turn, individually affected by a static card reader sensing coded information on a record card. Thus, the energizing signals from the tape reader control the crossbar switch to effect a distribution of test signals through a card reader to an electrical circuit system under test. The card reader also controls a monitoring of a plurality of electrical output signals from the electrical system to sense any abnormalities in the operation thereof.

A better understanding of the present invention may be had from the following detailed description when read in connection with the accompanying drawing, in which the single figure is a schematic representation of an electrical system testing device embodying the present invention.

Referring to the single figure in more detail, there is shown an electrical system testing device 1 with a crossbar relay switch 2. The crossbar relay switch 2 may be any suitable electrical or electro-mechanical device used to connect selected lines of a plurality of input signal lines to selected lines of a plurality of output signal lines. A suitable electro-mechanical device is the Cunningham, type F, Crossbar Switch, manufactured by James Cunningham Son & Co., Inc., Rochester, New York.

A tape reader 3 is used to energize the crossbar switch 2 along a plurality of energizing signal lines 4. The tape reader 3 may be any suitable device for sensing the information on an information storage member 5, such as a tape, containing information recorded thereon in any of the well-known forms, such as a series of groups of punched holes. An energizing signal from a suitable power source (not shown) is applied through a power supply signal line 6 to the tape reader 3 for selective distribution in accordance with the information on the storage member 5. A disconnect relay 7 provides means to control the connections of the energizing signal lines 4 to the crossbar switch 2 and comprises a plurality of relay contacts 8 controlled by a relay coil 9.

A test signal source 10 is connected to the crossbar switch 2 to provide a plurality of test signals to be sequentially applied to selected ones of a plurality of test signal supply lines 10a through the crossbar switch 2. Thus, the crossbar switch 2 controls the selective and sequential distribution of the test signals from a test signal source 10 to a plurality of test signal lines 10a according to the information recorded on the storage member 5.

A first card reader 11 effects a control of a final selective distribution of the test signals and the initiation of other control functions with respect to an electrical system 12 under test. The card reader 11 may be any suitable device for sensing information recorded on an information storage card to selectively control a plurality of input signals; such devices being well-known in the art. A suitable device is a card reader manufactured by Taurus Corporation, Lambertville, New Jersey. The electrical system 12 under test may be any electrical system having both interconnected and independent circuitry, which system may be tested for proper operation by selectively and sequentially energizing the circuits thereof.

A second card reader 13, similar to the first card reader 11, is used to control the distribution of output operating signals from the electrical system 12. The second card reader 13 distributes the output signals to a plurality of signal monitors 14, 15. The signal monitors 14 and 15 may be any suitable electrical or electro-mechanical measuring devices used to sense an input signal and to produce an output signal representative of the input signal; e.g., a contacting galvanometer.

A first group of signal monitors 14 is controlled by the crossbar switch 2 to sense the output signals from the second card reader 13. The first group of signal monitors 14 may be used to sense the effect of the input test signals as applied to the electrical system 12 by the first card reader 11. A second group of signal monitors 15 is connected to the electrical system 12 by the second card reader 13 to sense certain system circuit signals on a continuous basis, i.e. during the testing period of the electrical system 12. These signals may be indicative of the operation of the electrical system 12; e.g. filament current, supply voltage, etc.

The output signals from the monitors 14 and 15 are arranged to be indicative of an abnormality in the effect of the input test signal or in the condition of an electrical system operating signal. The output signals from the monitors 14 and 15 are effective to control the tape reader 3 by means of a start-stop switch 16, such as a relay coil and push-button actuated double-pole, double-throw switch. The monitor output signals actuate the start-stop switch by means of the aforesaid relay coil to stop the operation of the tape reader 3. The start-stop switch 16 may also be used, as shown, to simultaneously energize the disconnect relay 7 to disconnect the tape reader 3 from the crossbar switch 2. A subsequent manual operation of the start-stop switch 16 is effective to start the operation of the tape reader 3 and to de-energize the disconnect relay 7.

The mode of operation of the apparatus of the present invention follows:

Assume the input and output terminals of the electrical system 12 are connected to the corresponding terminals of the card readers 11 and 13 representing the output and input terminals, respectively, of the testing apparatus 1.

The tape reader 3 and the card readers 11 and 13 are provided with appropriate storage members having recorded thereon the test data suitable to effect a test cycle for the particular electrical system 12. It is apparent that the tape reader 3 may include means for searching the tape storage member 5 to select a particular portion of test data recorded thereon; such devices being well-known in the art. A suitable device for searching magnetic tape is manufactured by Hycon Eastern, Incorporated, Cambridge, Massachusetts and is designated as Magnetic Tape Search Unit, Model 202. This searching operation may be effected after a malfunction of the electrical system 12 or before the testing of a particular portion of the system 12. The start-stop switch 16 is manually actuated to energize the tape reader 3 and to de-energize the disconnect relay 7.

The de-energization of the disconnect relay 7 is effective to connect the energizing signal lines 4 to the cross-bar switch 2. The energizing signal lines 4 are selectively and sequentially energized by the tape reader 3 according to the information stored on the storage member 5. This selective energization is fed to the cross-bar switch 2 to sequentially energize selected ones of the control circuits of the cross-bar switch 2.

The test signal source 10 is arranged to supply, to the cross-bar switch 2, the various test signals desired for testing the electrical system 12. The aforesaid selective energization of the cross-bar switch 2 is effective to sequentially connect selected ones of the test signals to the first card reader 11 along selected ones of the test signal lines 10a. The card reader 11 further distributes the selected sequential test signals to the electrical system 12 according to the information recorded on its associated storage member.

Thus, it may be seen that the selection of a tape storage member 5 for the tape reader 3 and a storage member for the card reader 11 suitable for the particular electrical system 12 is effective to sequentially and selectively apply test signals thereto.

The testing apparatus 1 is also connected to the electrical system 12 to sense the effects of the above-mentioned test signals and to sense any abnormalities in the operation thereof. Accordingly, a plurality of output lines from the electrical system 12 are connected to a second card reader 13. It is obvious that the second card reader 13 and the first card reader 11 may be combined into one card reader sensing two separate portions of a card storage member.

As previously mentioned, a first group of signal monitoring devices 14 are provided for sensing the effects of the test signals distributed by the first card reader 11. The output signals from the electrical system 12 produced by the corresponding input test signals are distributed by the second card reader 13 to the first group of monitoring devices 14 according to the information stored on a card storage member appropriate for the particular system 12.

The appropriate test monitoring device of the first group of monitors 14 corresponding to the application of a test signal is selected by the cross-bar switch 2. This selection is effected by energizing another output line from the cross-bar switch 2 in addition to and having a test relationship with the selected test signal line 10a. This monitor selection operation may be effected at any time that will afford a monitoring of the result of the application of the test signal. Thus, the cross-bar switch 2 effects, in addition to a selective application of a test signal, a selective energization of a test monitoring device of the first group of monitors 14 suitable for sensing the effect of that test signal.

Thus, assuming an input test signal was applied to energize a circuit within the electrical system 12, a test monitor of the first group of monitors 14 would be selected to receive the result of the application of the test signal. This selection is the coincident effect of the routing of the output signal by the second card reader 13 and the energization of a test monitoring device 14 by the cross-bar switch 2.

The output signals from the first group of monitors 14 representing an abnormality in the effect of the test signals are fed to the start-stop switch 16. The effect of these output signals is to energize the start-stop switch device 16 whereby to stop the tape reader 3 and to energize the program disconnect switch 7. The testing apparatus 1, consequently, is effective to indicate the presence of an abnormality in the effect of a test signal and to identify the defective circuit by means of the information recorded on the storage member 5 at the point of the termination of the testing operation.

A second group of signal monitoring devices 15 are connected by the second card reader 13 for a continuous monitoring of a plurality of system operating conditions; such as filament current, etc., in the electrical system 12. An abnormality of the system operating conditions is effective to produce an output from the second group of monitors 15 to energize the start-stop 16 in a manner similar to that described with respect to an abnormality in the effect of a test signal. The identification of the abnormality may be accomplished by means of the information on the card member in the second card reader 13. This information may be arranged to indicate the monitoring function of each signal monitor in the second group of monitors 15 for the particular system 12.

A resumption of the test cycle after a removal of the abnormal circuit condition is effected by a manual operation of the start-stop switch 16. The further operation of the testing apparatus 1 is similar to that previously described with respect to the initial operation.

Thus, it may be seen that there has been provided, in accordance with the present invention, a programmed electrical system testing apparatus which is characterized by the ability to automatically test an electrical system and to respond to abnormalities in the operation of the electrical system, with an identification of the particular abnormality.

What is claimed is:

1. An electrical system testing apparatus comprising, in combination, an information-storage-tape reading means, said reading means including means responsive to sensed information from a storage tape for sequentially energizing selected ones of a plurality of energizing signal lines according to the information on a storage tape, a swtiching means for connecting selected ones of a plurality of test signal input lines to selected ones of a plurality of test signal output lines, means connecting said energizing signal lines from said tape reading means to said switching means whereby said switching means is controlled by said tape reading means, a test signal source connected to said test signal input lines of said switching means, said signal source supplying a plurality of test signals on respective ones of said test signal input lines, a first information-storage-card reader connected to said test signal output lines of said switching means, said card reading means including means responsive to sensed information from a storage card for distributing said test signals to an electrical system under test according to the information stored on a storage card, a second information-storage-card reader, a plurality of electrical system signal monitoring devices, said second reader including means responsive to sensed information from a storage card for connecting said monitoring devices to said electrical system according to the information stored on storage-card, means connecting said monitoring devices to said siwtching means for sequentially energizing selected ones of said monitoring devices to sense operating signals from said electrical system, and a stop means responsive to signals from said monitoring means to terminate the operation of said tape reading means during the occurrence of an abnormality in the operating signals from said electrical system.

2. An electrical system testing apparatus comprising a first means for reading information stored on a first storage member, a switching means for connecting ones of a plurality of input lines to selected ones of a plurality of output lines, said switching means being connected to said first means for reading information to selectively and sequentially connect said input lines to said output lines according to the information stored on said storage member, a test signal supply means connected to said input lines, a second means for reading information stored on a second storage member, said second means being connected to said output lines to route said output lines to an electrical system under test according to the information stored on said second storage member, a third means for reading information stored on a third storage member, a plurality of signal monitoring devices, said third means connecting said system under test to said monitoring devices according to the information stored on said third storage member, and a stop means responsive to said monitoring devices to terminate the operation of said first means upon the occurrence of an abnormality in the operation of said system equipment.

3. An electrical system testing apparatus having a plurality of output terminals and a plurality of input terminals comprising test signal means for sequentially and automatically generating and distributing a plurality of test signals to said output terminals for connection to an electrical system under test, said test signal means including a first means for reading information stored on a first storage member to selectively and sequentially connect selected ones of a plurality of test signal lines to ones of a plurality of output signal lines according to the information stored on said first storage member, and a test signal supply means connected to said test signal lines, a second means for reading information stored on a second storage member, said second means being connected to said output signal lines to route said output lines to said output terminals according to the informaion stored on said second storage member, a signal monitoring means connecting through said input terminals to said electrical system to sense abnormalities in the operating signals therefrom, said monitoring means including a third means for reading information stored on a third storage member, a plurality of signal monitoring devices, said third means connecting said system under test to said monitoring devices according to the information stored on said third storage member, and a stop means responsive to said monitoring devices to terminate the operation of said first means upon the occurrence of an abnormality in the operation of said system equipment.

4. An electrical system testing apparatus comprising, in combination, an information-storage-tape reading means, said reading means including means responsive to sensed information from a storage tape for sequentially energizing selected ones of a plurality of energizing signal lines according to the information on a storage tape, a siwtching means for connecting selected ones of a plurality of test signal output lines, disconnect means connecting said energizing signal lines from said tape reading means to said switching means whereby said switching means is controlled by said tape reading means, said disconnect means including a relay operated switch for simultaneously disconnecting said energizing signal lines from said switching means, a test signal source connected to said test signal input lines of said switching means, said signal source supplying a plurality of test signals on respective ones of said test signal input lines, a first information-storage-card reader connected to said test signal output lines of said switching means, said card reading means including means responsive to sensed information from a storage card for distributing said test signals to an electrical ssytem under test according to the information stored on a storage card, a second information-storage-card reader, a plurality of electrical system signal monitoring devices, said second reader including means responsive to sensed information from a storage card for connecting said monitoring devices to said electrical system according to the information stored on storage-card, means connecting said monitoring devices to said switching means for sequentially energizing selected ones of said monitoring devices to sense operating signals from said electrical system, and a stop means responsive to signals from said monitoring means to terminate the operation of said tape reading means and to energize said disconnect means to disconnect said energizing signal lines from said switching means during the occurrence of an abnormality in the operating signals from said electrical system.

5. An electrical system testing apparatus having a plurality of output terminals and a plurality of input terminals comprising test signal means for sequentially and automatically generating and distributing a plurality of test signals to said output terminals for connection to an electrical system under test, said test signal means including a first means for reading information stored on a first storage member, a switching means for connecting ones of a plurality of test signal lines to selected ones of a plurality of output signal lines, said switching means being connected to said first means for reading information to selectively and sequentially connect said test signal lines to said output signal according to the information stored on said storage member and a test signal supply means connected to said test signal lines, a second means for reading information on a second storage member, said second means being connected to said output signal lines to route said output lines to said output terminals according to the informaion stored on said second storage member, a signal monitoring means connected through said input terminals to said electrical system to sense abnormalities in the operating signals therefrom, said monitoring means including a third means for reading information stored on a third storage member, a plurality of signal monitoring devices, said third means connecting said system under test to said monitoring devices according to the information stored on said third storage member, and a stop means responsive to said monitoring devices to terminate the operation of said first means upon the occurrence of an abnormality in the operation of said system equipment.

6. An electrical system testing apparatus comprising a first means for reading information stored on a first storage member, a switching means for connecting selected ones of a plurality of input lines to selected ones of a plurality of output lines, said switching means being connected to said first means for reading information to selectively and sequentially connect said input lines to said output lines according to the information stored on said storage member, a test signal supply means connected to said input lines, a second means for reading information stored on a second storage member, said second means being connected to said output lines to route said output lines to an electrical system under test according to the information stored on said second storage member, a third means for reading information stored on a third storage member, and a plurality of signal monitoring devices, said third means connecting said system under test to said monitoring devices according to the information stored on said third storage member whereby to sense an abnormality in the operation of said system equipment.

7. An electrical system test apparatus comprising a first means for reading information stored on a first storage member, a switching means for connecting selected ones of a plurality of input lines to selected ones of a plurality of output lines, said switching means being connected to said first means for reading information to selectively and sequentially connect said input lines to said output lines according to the information stored on said storage member, a test signal supply means connected to said input lines, a second means for reading information stored on a second storage member, said second means being connected to said output lines to route said output lines to an electrical system under test according to the information stored on said second storage member, a plurality of signal monitoring devices, and a third means for reading information stored on said second storage member, said third means connecting said system under test to said monitoring devices according to the information stored on said second storage member whereby to sense an abnormality in the operation of said system equipment.

8. An electrical system testing apparatus comprising a first means for reading information stored on a first storage member, a switching means for connecting selected ones of a plurality of input lines to selected ones of a plurality of output lines, said switching means being connected to said first means for reading information to selectively and sequentially connect said input lines to said output lines according to the information stored on said storage member, a test signal supply means connected to said input lines, a second means for reading information stored on a second storage member, said second means being connected to said output lines to route said output lines to an electrical system under test according to the information stored on said second storage member, a plurality of signal monitoring devices, a third means for reading information stored on said second storage member, said third means connecting said system under test to said monitoring devices according to the information stored on said second storage member, and a stop means responsive to said monitoring devices to terminate the operation of said first means upon the occurrence of an abnormality in the operation of said system equipment.

References Cited in the file of this patent

UNITED STATES PATENTS

| | | |
|---|---|---|
| 2,762,014 | Anderson | Sept. 4, 1956 |
| 2,849,678 | Hannon | Aug. 26, 1958 |
| 2,892,153 | Neill | June 23, 1959 |
| 2,963,652 | Taylor et al. | Dec. 6, 1960 |

OTHER REFERENCES

"Automatic Functional Tester," article in Electronic Design, June 15, 1956; pages 46, 47.